United States Patent Office 3,202,556
Patented Aug. 24, 1965

3,202,556
METHOD FOR GELLING WATER-BEARING EXPLOSIVE COMPOSITIONS CONTAINING GALACTOMANNAN GUMS
Joseph D. Chrisp, Claymont, Del., assignor to E. I. du Pont de Nemours and Company, Wilmington, Del., a corporation of Delaware
No Drawing. Filed July 23, 1963, Ser. No. 296,932
14 Claims. (Cl. 149—20)

This invention relates to a process for gelling aqueous solutions of water-dispersible, non-ionic hydroxyl polymers. More particularly, this invention relates to a process for making water-bearing gels containing galactomannans and to certain products obtained thereby including explosives.

Water-soluble gums have been articles of commerce for hundreds of years. These gums constitute a class of substances, organic in nature and related to the sugars and carbohydrates. They have the characteristic property of forming viscous solutions or mucilages either by dissolving, i.e., dispersing uniformly, in water or by absorbing many times their own volume of water. In water, colloidal solutions, or sols, are formed. The physical properties of such solutions usually are characteristic of one or a small group of related gums, so that a wide range of properties can be obtained by use of different gums under a variety of conditions. The properties of water-soluble gums, especially in solutions, make them extremely valuable in manufacturing processes. The textile, cosmetic, pharmaceutical, and food industries, and to a lesser extent other industries, have found a wide application for the gums. These materials can increase the viscosity of solutions very remarkably, and often can give gel structures at increased but relatively low concenrtations of gum. The viscosity-building, or thickening, action of the gums in aqueous systems may be all that is desired at times, whereas in other circumstances a substantial immobilization of the water-bearing composition is desired by formation of a gel. Gel formation is desired especially if undissolved solids are present in the system and must be maintained in a relatively uniform state of dispersion therein even after removal from the mixer or other dispersing device.

As used herein, a gel is a mixture, one component of which is water, homogeneous down to substantially colloidal dimensions and capable of resisting a finite shearing force. This resistance to shearing is evidence of some sort of continuous mechanical network or structure, which, however, can consist of a relatively small fraction of the total mass. Thus, the gel forms a matrix in which both dissolved and undissolved components may be distributed. Simply cooling a gum solution prepared at elevated temperatures, or increasing the concentration of the dissolved or dispersed gum may lead to gel formation. Such gels, however, often have relatively low practical utility because they are physically weak and tend to rupture and crumble, or because gel formation is reversible with increases in temperature, or because the gel structure collapses in the presence of other components in the mixture, especially in the presence of dissolved electrolytes. Further, the increased concentration of relatively expensive gum which is required to obtain a greater degree of immobility of the aqueous system often imposes a substantial economic penalty on the resulting composition.

One of the industrially important classes of gums is the galactomannans of which locust bean and guar gums are most important. These useful gums have a high tolerance for dissolved electrolytes and produce high viscosity solutions in water and in salt solutions, but said solutions or sols gel only at relatively high concentrations of galactomannan. As a consequence, crosslinking agents are used to hasten the formation of gels, or they may be employed to form gels which have desired physical properties at relatively low gum concentrations, or even have properties not obtainable by the use of the gum alone. An effective and well known crosslinking agent for the hydrated galactomannans, especially for guar gum, is the borate ion which acts as a crosslinking agent with hydrated guar gum to form cohesive structural gels. The process of crosslinking guar-containing compositions by adding borate ions has been employed in the manufacture of ammonium nitrate-based blasting agent compositions, as disclosed and claimed in U.S. Patent No. 3,072,509. Such blasting agents have a desirable body which resists dispersion of the compositions by water and facilitates their handling and loading. Also, such crosslinked blasting agents are economical and safe to use, and have better storage properties, that is, they retain their favorable physical properties for a considerably longer period of time, than do similar compositions which are made thicker simply by increasing the concentration of gum without addition of a crosslinking agent.

Experience in the use of the borate-crosslinked gels has shown, however, that the gels will degrade under adverse conditions of storage, for example at 100° F., even when protected from loss of water by evaporation. Deterioration in storage is even more apparent in the gels containing high concentrations of electrolytes such as the ammonium nitrate-containing blasting agent compositions referred to hereinbefore.

This invention provides a unique process for forming stable gels of galactomannan gums having, for example, many times the stability of borate-crosslinked galactomannan gum gels. Also, this invention provides a process for readily controlling the rate of gelation of galactomannan gums and the consistency of the gels obtained thereby and, thus, provides gels having a wide spectrum of utility.

The process of this invention for gelling aqueous solutions of galactomannan gum comprises mixing water, galactomannan gum, about from 0.05 to 20%, calculated as metal (i.e., Sb or Bi) and based on the weight of galactomannan, of at least one crosslinking agent selected from the group consisting of compounds of the metals antimony and bismuth soluble in the system, and a base, said gelation being carried out at a pH of about from 6 to 13, and preferably 7 to 11. In general, it is desirable to appreciably hydrate the galactomannan prior to the addition of base since at higher pH's, for example, above 10, hydration is materially retarded. Hydration is evidenced by an appreciable increase in the viscosity, that is, thickening, of aqueous galactomannan gum solutions, for example, at least a ten—and usually at least a 1000—or more fold increase in viscosity. Although the antimony and bismuth crosslinking agents can be added to the galactomannan-containing mixture after the pH thereof has been adjusted by the addition of base, usually it is preferred to add the base after the cross-linking agent is added to the galactomannan and water. Thus, it is preferred to add the crosslinking agent either with the galactomannan or to a preformed galactomannan solution, then add base. Alternately, however, if a crosslinking agent such as antimony oxide and a slowly reacting base such as magnesium oxide are used, the galactomannan, crosslinking agent and base can be added to water simultaneously. Efficient crosslinking of the galactomannan then begins after the addition of the base. As described more fully hereinafter, the extent and speed of crosslinking and gelation varies with the particular antimony or bismuth compound selected, the strength of the base employed and concentration of the crosslinking agent and base. In general, for a given galactomannan concentration, the speed of crosslinking and, to a lesser degree, the extent thereof increase with the solubility of the crosslinking agent and the strength of the base employed. Similarly, all other things being held constant, the apparent rate and degree of crosslinking increase with galactomannan concentration.

The process of the instant invention is effective in crosslinking galactomannan gums such as locust bean gum and guar gum, and also other galactomannan gums which include those from endosperms of seeds of leguminous plants such as the sennas, brazilwood, tara, honey locust, paloverde, and rattlebox, alfalfa gum, clover gum, and fenugreek gum. In commerce, however, the most important galactomannan gums are locust bean gum and guar bum. Locust bean gum also is marketed under other names which include Carob gum, gum Gatto, gum Hevo, Jandagum, Lakoegum, Rubigum, Lupogum, Luposol, gum Tragon, Tragarab, and Tragasol. Guar gum, on the other hand, generally is identified as such. It is made by milling endosperm from seeds of the guar plant, *Cyamopsis tetragonolobus*, family Leguminosa, an annual crop. Preferably, the aqueous gelation systems contain about from 0.25 to 5% by weight of one or more of the aforementioned, although solutions containing 10% or higher can be used.

The kind of antimony or bismuth compound which is used as crosslinking agent is not critical so long as the corresponding dissolved metal species is available for crosslinking the dissolved galactomannan. The terms "compounds of the metals antimony and bismuth soluble in the system" as used herein refer to antimony and bismuth compounds sufficiently soluble to provide the aforementioned quantities of antimony or bismuth in ionic form, preferably as $Sb^{+3}$, $Bi^{+3}$, $SbO^{+1}$ or $BiO^{+1}$ or a combination thereof, in the gelation system, for example, in aqueous or aqueous nitrate-containing solutions of galactomannan gum during the gelation reaction. In general, the foregoing is fulfilled by antimony and bismuth compounds soluble to the extent of at least 1 part per million in the gelation system. The antimony or bismuth crosslinking agents can provide the aforementioned reactive species either before or after addition of base. Examples of antimony and bismuth compounds which can be used in the process of this invention include oxides and organic and inorganic salts of bismuth and antimony such as antimony oxide, antimony chloride, antimony oxychloride, antimony sulfate, antimonyl sulfate, antimony tartrate, potassium antimonyl tartrate, sodium pyroantimonate, antimony fluoride, antimony citrate, bismuth oxide, bismuth chloride, bismuth citrate, sodium bismuthate, bismuth nitrate and mixtures thereof. Antimony oxide is a preferred crosslinking agent because of its ready availability, low cost, and optimum crosslinking action. Salts of antimony and bismuth, for example, with strong mineral acids, can be added to the solutions of galactomannan gum in the corresponding acid (e.g., $SbCl_3$ in dilute HCl) provided sufficient hydroxyl ions are subsequently supplied to neutralize the added acid. Examples of additional antimony and bismuth salts include soluble salts of antimony and bismuth with mono- and polycarboxylic acids, particularly hydroxylated polybasic acids. As previously indicated, the antimony and bismuth crosslinking agents are added in a concentration of 0.05 to 20% by weight of metal based on the weight of galactomannan. In explosive compositions described more fully hereinafter, preferably about from 0.3 to 10% by weight of antimony or bismuth is employed.

Antimony oxide alone, over a period of days, will slowly and partially crosslink galactomannan in solutions protected against bacterial attack, especially if said solutions are held at an elevated temperature. The crosslinking action, however, is markedly more effective, and is controllable, by the addition of a base. The use of a base in combination with an antimony or bismuth compound is critical in the practice of the present invention. The term "base" as used herein refers to materials which when dissolved in water produce hydroxide ions in concentrations substantially greater than the concentration normally present in water. Examples of bases which can be used in this invention are strong bases such as sodium hydroxide, potassium hydroxide, and other alkali metal hydroxides, as well as weaker bases such as ammonium hydroxide and dimethylamine; alkaline salts such as $Na_2CO_3$, $Na_3PO_4$, and complex alkaline salts containing antimony and bismuth such as potassium antimony tartrate which supply both crosslinking agent and a source of hydroxyl ions; alkaline earth hydroxides, such as magnesium, calcium and barium hydroxides; and the corresponding oxides, MgO, CaO and BaO. As to the amount of base added, in the broad aspect of this invention the critical requirement is that enough hydroxyl ion be supplied to the reaction mixture either initially or during the process to initiate gelation and to produce a gel of the desired consistency. Enough hydroxyl ion must be supplied to raise the pH value to about 6.0, but not higher than 13. At the higher pH values in this range, crosslinking is more rapid and more complete. Excessive concentrations of hydroxyl ion, however, may cause syneresis to occur. Preferably the pH of the composition will be in the range of 7 to 11. pH as used herein is a measure of hydroxide ion concentration in the mixture of the process of this invention. However, although a major portion of the process of this invention should be carried out within about the indicated pH ranges, it is recognized that hydroxide ions are consumed in the reaction. Thus, toward the end of the process, the pH may drop somewhat below about 6.

The crosslinking action of antimony and bismuth compounds occurs rapidly upon the addition of a strong base and less rapidly with weaker bases or with bases which supply hydroxyl ions gradually, so that time and extent of gelation can be regulated by suitably adjusting the kind and amount of base which is incorporated into the mixture. To illustrate, a composition similar to that of Example 1, except that it contains only one-half the amount of antimony oxide shown in Example 1, and includes 0.24 part of sodium hydroxide instead of magnesium oxide, has a viscosity greater than 2,000,000 centipoises in less than 10 minutes. A comparable composition made with 2.0 parts of magnesium oxide instead of 0.24 part of sodium hydroxide reaches a viscosity of 2,000,000 centipoises in a period between 4 and 24 hours.

Magnesium oxide is a preferred base because an adequate amount of hydroxide ion is released at a convenient rate effective for crosslinking the galactomannan without causing the composition to gel excessively before it can be poured or pumped from the mixer, and because an excess of hydroxide ion is never generated by the presence of unconsumed magnesium oxide. In general, particularly in the water-bearing explosives described hereinafter, about from 0.1 to 5 and, preferably, 0.3 to 2% of magnesium oxide is used.

As indicated above, the rate of gelation and final viscosity of a gelled composition will be related to the kind and concentration of the galactomannan, the kind and concentration of the crosslinking agent, and the source and concentration of hydroxide ions. Thus, it will be apparent that the variables are interrelated and conveniently are adjustable to provide a gel having the desired properties both during manufacture and during storage.

The process of this invention can be carried out with the aforementioned galactomannans, water, antimony or bismuth crosslinking agent and base as the sole constituents of the reaction mixture. In such case, the process of this invention and the products obtained thereby find utility, for example, as paper and textile sizing and in drilling muds. However, in the aforementioned applications as well as in other applications, the reaction mixture can also contain other dispersed or dissolved ingredients. Thus, the process of this invention finds particular utility in making conventional aqueous blasting agents.

In general, aqueous blasting agents prepared in accordance with this invention can be described as stable, gelled, water-bearing explosive compositions comprising at least one water-soluble, inorganic oxidizing salt, at least one fuel, about from 5 to 45, and preferably 10 to 30% of water based on the total weight of composition and, based on the total weight of composition, about from 0.25 to 5% of galactomannan gum gelled at a pH of about from 6 to 13 with base and at least one compound of the metals antimony and bismuth soluble in the system, said compounds being present in an amount of about from 0.05 to 20%, calculated as antimony or bismuth and based on the weight of galactomannan. In general, except for the gel matrix, such water-bearing explosives are of the conventional type and contain at least about 20% by weight of inorganic oxidizing salt including, for example, mixtures of one or more ammonium, alkali metal or alkaline earth metal nitrates, perchlorates or dichromates such as ammonium nitrate, ammonium perchlorate, sodium nitrate, sodium perchlorate, potassium nitrate, potassium perchlorate or calcium nitrate. Preferably, the inorganic oxidizing salt component contains at least 45% by weight of at least one salt which is highly soluble in water at room temperature, that is, at least as soluble as ammonium nitrate and, preferably, the aqueous phase in the composition contains a substantial proportion of oxidizing salt, for example, 40 to 70% by weight thereof. Self-explosive, non-explosive carbonaceous, and metallic fuels or mixtures of the aforementioned types of fuels can be employed. Examples of self-explosive fuels, that is, substances which per se are generally recognized as explosives and which have a negative oxygen balance with respect to conversion to carbon dioxide, water and nitrogen are TNT, pentaerythritol tetranitrate (PETN), cyclotrimethylenetrinitramine (RDX), explosive-grade nitrocellulose as well as mixtures thereof such as pentolite (PETN/TNT) and Composition B (RDX/TNT). In general, up to about 40 and, preferably, 10 to 35% by weight of the self-explosive fuel is used. Examples of non-explosive carbonaceous fuels include finely-divided coal and other forms of finely-divided carbon; solid carbonaceous vegetable products such as starch, ivory nut meal, woodpulp, sugar and bagasse, as well as solid and liquid organic hydrocarbons such as powdered paraffin wax and fuel oil; fatty oils; vegetable oils; and mixtures of the foregoing. The galactomannan gums also supply the dual function of cross-linking and providing a fuel. In general, up to 25 and, preferably, 2 to 20% by weight of such carbonaceous non-explosive fuels are employed.

Metallic fuels include aluminum, iron and alloys of such metals, e.g., aluminum-magnesium alloys, ferrosilicon and ferrophosphorus, as well as mixtures of such metals and alloys. The quantity of metallic fuels varies markedly with the particular fuel employed and can constitute up to 50% by weight of the total composition. With finely-divided aluminum, for example, 1 to 20% by weight is usually used, while with heavier metallic fuels such as ferrophosphorus and ferrosilicon, on the order of 10 to 30% is usually employed.

Preferred blasting agents of this invention are stable, gelled, slurry explosives having an oxygen balance of about from −30 to +10% and, preferably, in the case of those blasting agents not containing the aforementioned heavier metallic fuels, −10 to +10%, and comprising, in addition to the aforementioned gel matrix, about from 20 to 60%, based on the total composition, of ammonium nitrate, up to 40% and, preferably, 10 to 25% of sodium nitrate, up to 40% and, preferably, 10 to 30% of self-explosive comprising TNT and 5 to 30%, and preferably, 10 to 25% by weight of water.

In general, the explosive compositions of this invention can be prepared by the conventional formulating techniques used for preparing galactomannan or borate-crosslinked galactomannan aqueous explosives, excepting, of course, that the aforementioned antimony and bismuth crosslinking agents are employed and the gelation is carried out in situ after the addition of base, preferably at the end of the formulating steps. The same general considerations for the control of the process of this invention, discussed hereinbefore with respect to reaction mixtures consisting of galactomannan, crosslinking agent, base and water, apply with respect to the blasting agents of this invention, although there may be some relative variation in effects or desirable adjustments in order to give gelled compositions having the desired physical and storage properties for explosives. Thus, for example, preferably in explosive compositions, the concentration of antimony or bismuth crosslinking agent calculated as metal and based on the amount of galactomannan is about from 0.3 to 10% and, preferably, 0.5 to 5%, and in the case of ammonium nitrate blasting agents, in order to minimize evolution of ammonia, the pH is held below about 8 or 9. Also, such explosives preferably contain about from 0.3 to 2% by weight of galactomannan, preferably guar gum.

In the preparation of blasting agents it is particularly convenient to use concentrated aqueous solutions of ammonium nitrate. In such case, the water for the gel matrix is conveniently provided by the aqueous solution of ammonium nitrate, and the other ingredients of the particular blasting agent are added thereto, including galactomannan, crosslinking agent and, preferably in the last step, base, care being taken that all ingredients are uniformly dispersed and that the galactomannan is well hydrated prior to the addition of base.

The explosive properties of the blasting agents of the instant invention when first made and cartridged are substantially identical with those of known compositions crosslinked by use of borax or other source of borate ion. The physical properties of the new compositions when first made and cartridged also are similar to those blasting agent compositions crosslinked by borate. As illustrated in detail in the examples, the superiority of the new process and the compositions obtained thereby is found in the greatly improved shelf life and storage properties of the products made according to the instant invention.

In the following examples which illustrate this invention all quantities are expressed as parts and percentages by weight, unless otherwise indicated.

EXAMPLE 1

Water (198 parts) at room temperature is vigorously agitated while to it is gradually added 2 parts of commercial powdered guar gum [known in the industry by such trade names as "Amatex" KD (General Mills) and "Jaguar" 100 (Stein-Hall)] until the gum is uniformly dispersed and hydrated, and free of lumps or aggregates. To the resulting solution is added 0.2 part of antimony oxide ($Sb_2O_3$) which also is uniformly mixed into the solution. This is followed by 2.0 parts of magnesium oxide which brings the pH of the reaction mixture to about 7 to 10. Crosslinking begins thereafter with evident thickening of the mixture, and continues over a period of time.

Thus, a solution of guar gum in water containing uniformly dispersed antimony oxide in proportions indicated above, but without MgO, after standing for about 24 hours at about 25° C. has a viscosity of about 20,000 centipoises (Brookfield Viscometer, No. 3 spindle, 0.3 r.p.m.). After adding the magnesium oxide (2.0 parts), mixing well and allowing the mixture to stand for an additional 24 hours at 25° C., the resulting crosslinked gel has a viscosity greater than 2,000,000 centipoises—too great to be measured with the same spindle and speed of the Brookfield viscometer.

When the preparation is repeated using 0.2 part of bismuth oxide ($Bi_2O_3$) dissolved in 1 part of 6 N nitric acid, instead of 0.2 part of $Sb_2O_3$, the viscosity of the gel within one hour after adding the magnesium oxide is greater than 2,000,000 centipoises.

When the preparation is repeated using 0.2 parts of borax ($Na_2B_4O_7 \cdot 10 H_2O$), crosslinking occurs very quickly to give a gelled composition having a viscosity (same Brookfield viscometer) greater than 2,000,000 centipoises, even in the absence of magnesium oxide. Such rapidity of crosslinking, however, may be disadvantageous because rapid gelling interferes with transfer or packaging operations which follow the mixing steps.

Similar, though not identical results are obtained when commercial powdered locust bean gum is used in place of guar gum. The concentration of galactomannan will be about from 0.25 to 5% by weight.

The compositions of this invention described above can be used as such in textile or paper sizes. Thus, for example, on a continuous basis stock to be sized can be first run through a bath of the guar gum, crosslinking agent and water, then run through an aqueous alkaline bath and finally allowed to crosslink, then dried.

The compositions of this invention described above can be used as such in textile or paper sizes. Thus, for example, on a continuous basis stock to be sized can be first run through a bath of the guar gum, crosslinking agent and water, then run through an aqueous alkaline bath and finally allowed to crosslink, then dried.

The instant inventive process as used in the manufacture of a blasting agent composition is illustrated in the following examples.

EXAMPLE 2

In a suitable mixer are placed 49 parts of 60% ammonium nitrate solution which is heated to a temperature of about 120–180° F., and, without further heating, 24.44 parts of granular sodium nitrate premixed with 1 part of finely ground guar flour is added and mixed for about 2 to 3 minutes. Pelleted or flaked TNT, 25 parts, is added and incorporated by mixing for about 1–2 minutes, followed by about 0.06 part of $Sb_2O_3$, also incorporated by continued mixing for about 1 minute. By this time, the guar gum is well dispersed and hydrated. Finally, about 0.5 part of MgO is added and incorporated by mixing for about one minute at which time further thickening of the mixture is apparent. The composition at a temperature of about 90–100° F. is discharged to a cartridging machine from which the composition is extruded into polyethylene tubes, which are closed after filling. The finished composition is a non-tacky gel having a density of about 1.4 g./cc. and a pH of about 7 to 9. The viscosity and strength of the gel composition increases appreciably during the first hour after cartridging, which is evidence that crosslinking is continuing. The mixture is uniform in appearance and in composition, and undissolved components remain uniformly dispersed. The composition is not cap sensitive, but can be primed with 100 g. of RDX and detonates with a velocity of about 4500 meters per second in 3½″ diameter columns.

EXAMPLE 3

A blasting agent is prepared as in Example 2 except that the composition is as follows:

|  | Parts |
| --- | --- |
| 60% ammonium nitrate liquor | 40 |
| Fine $NaNO_3$ | 14.7 |
| Pelleted TNT | 25.0 |
| Finely ground ferrophosphorus | 19.0 |
| Finely ground guar gum flour | 0.75 |
| Antimony oxide | 0.05 |
| Magnesium oxide | 0.5 | and the ferrophosphorus is added to the mixer and incorporated at the same time as the TNT. The density of this composition is about 1.7 g./cc., it is not cap-sensitive, but is primed by 100 g. of RDX and detonates with a velocity of about 4800 meters/seconds in 5″ diameter columns.

EXAMPLES 4 to 20

Examples 4 to 20 of blasting agent compositions of the instant invention prepared by the general procedure of Examples 2 and 3, are included in Table 1 below, wherein are exemplified the use of other antimony and bismuth crosslinking agents, and other sources of hydroxyl ions, in a variety of gelled blasting agent compositions. The overall composition for each example is shown on a percentage basis except that the amount of crosslinking agent is expressed as a percent of the weight of galactomannan gum in the composition because the quantity of crosslinking agent required is so small that it generally does not change the overall percentage composition within the limits of significance of the figures shown in Table 1. All compositions have a gel consistency such that the ingredients remain uniformly distributed, and segregation of components does not take place after the compositions are discharged from the mixer. On the other hand, additional thickening and gelation of the compositions to the desired final values occur subsequent to discharge from the mixer, especially during storage of the cartridged product.

*Table I*

| Example No. | Composition, percent by weight | | | | | | | Sb or Bi compound (percent based on guar gum) | Oxygen balance |
| --- | --- | --- | --- | --- | --- | --- | --- | --- | --- |
|  | Ammonium nitrate | $H_2O$ | Sodium nitrate | TNT | FeP | Guar gum | Base |  |  |
| 4 | 29.4 | 19.6 | 25.25 | 25.0 | 0 | 0.25 | 0.5 $NH_4OH$ | 10.0 $Sb_2O_3$ | −2 |
| 5 | 29.4 | 19.6 | 20.75 | 25.0 | 0 | 5.0 | 0.25 MgO | 0.3 $Sb_2O_3$ | −8 |
| 6 | 29.4 | 19.6 | 24.75 | 25.0 | 0 | 0.75 | 0.5 MgO | 5.0 $SbCl_3$ | −2 |
| 7 | 29.4 | 19.6 | 25.0 | 25.0 | 0 | 0.75 | 0.25 $Ca(OH)_2$ | 5.0 $Sb_2O_3$ | −2 |
| 8 | 29.4 | 19.6 | 24.75 | 25.0 | 0 | 0.75 | 0.5 MgO | 5.0 SbOCl | −2 |
| 9 | 29.4 | 19.6 | 24.25 | 25.0 | 0 | 0.75 | 1.0 $Na_3PO_4$ | 10.0 $K(SbO)C_4H_4O_6 \cdot 1/2 H_2O$ | −2 |
| 10 | 29.4 | 19.6 | 24.25 | 25.0 | 0 | 0.75 | 1.0 $Ca(OH)_2$ | 5.0 $Sb_2(SO_4)_3$* | −2 |
| 11 | 29.4 | 19.6 | 24.75 | 25.0 | 0 | 0.75 | 0.5 MgO | 5.0 $(SbO)_2SO_4$* | −2 |
| 12 | 29.4 | 19.6 | 24.75 | 25.0 | 0 | 0.75 | 0.5 $(CH_3)_2NH$ | 10.0 $Bi(NO_3)_3 \cdot 5 H_2O$ | −2 |
| 13 | 29.4 | 19.6 | 24.25 | 25.0 | 0 | 0.75 | 1.0 $Ca(OH)_2$ | 10.0 $Bi_2O_3$ | −2 |
| 14 | 29.4 | 19.6 | 24.75 | 25.0 | 0 | 0.75 | 0.5 NaOH | 5.0 $Bi(NO_3)_3 \cdot 5 H_2O$ | −2 |
| 15 | 29.4 | 19.6 | 24.25 | 25.0 | 0 | 0.75 | 1.0 NaOH | 3.0 $BiCl_3$* | −2 |
| 16 | 29.4 | 19.6 | 24.75 | 25.0 | 0 | 0.75 | 0.5 MgO | 2.0 BiOCl* | −2 |
| 17 | 29.4 | 19.6 | 24.00 | 25.0 | 0 | **1.0 | 1.0 MgO | 5.0 $Sb_2O_3$ | −2 |
| 18 | 29.4 | 19.6 | 22.25 | 25.0 | 0 | 0.75 | 3.0 MgO | 0.3 $Sb_2O_3$ | −2 |
| 19 | 35.0 | 18.0 | 26.5 | 20.0 | 0 | 0.5 | 0.5 MgO | 5.0 $Sb_2O_3$ | +4 |
| 20 | 24.0 | 16.0 | 15.5 | 25.0 | 19 | 0.5 | 0.5 MgO | 5.0 $Sb_2O_3$ | −20 |

*Dissolved in small amount of the parent acid.
**Locust bean gum.

EXAMPLES 21 to 26

In order to evaluate the stability of gelled blasting agent compositions, a sample of each cartridged composition, or the same composition in a tightly closed glass container, is placed in a chamber maintained at 100° F. This is representative of a moderately high temperature which might be experienced in a field storage magazine or a service truck. The compositions stored at 100° F. are inspected at 24-hour intervals for evidence of deterioration such as obvious softening and slumping of the gel structure, visible segregation of liquid (syneresis) or of insoluble high density materials such as TNT and ferrophosphorus, foaming, and development of tackiness and stickiness in compositions which originally were tough non-adherent gels. As illustrated in Table II below, compositions crosslinked with borax will noticeably deteriorate after 1 to 2 weeks of storage at 100° F., whereas compositions of the instant invention having similar initial gel characteristics do not break down or noticeably deteriorate in 12 weeks or more of storage at 100° F. The compositions shown in Table II are prepared by the general procedures described in the preceding examples.

chloride, antimony oxychloride, antimonyl sulfate, antimony sulfate, sodium pyroantimonate, antimony fluoride, and antimony tartrate.

5. A process of claim 1 wherein said crosslinking agent is selected from the group consisting of bismuth oxide, sodium bismuthate, bismuth chloride, bismuth nitrate, and bismuth citrate.

6. A process of claim 1 wherein after said crosslinking agent is added to said solution, said pH is adjusted to about from 6 to 13 by adding base to the reaction mixture.

7. A process for the gelation of guar gum which comprises adding to an aqueous solution containing water Table II

| Example No. | Composition, percent by weight | | | | | | | Crosslinking agent (percent based on Guar gum) | Time for deterioration |
|---|---|---|---|---|---|---|---|---|---|
| | Ammonium nitrate | H$_2$O | Sodium nitrate | TNT | FeP | Guar gum | Base | | |
| Control | 29.4 | 19.6 | 25.0 | 25.0 | 0 | 1.0 | | 1.0 Borax | 1-2 weeks. |
| Control | 29.4 | 19.6 | 25.25 | 25.0 | 0 | 0.75 | | 3.0 Borax | 1-2 weeks. |
| 21 | 29.4 | 19.6 | 25.25 | 25.0 | 0 | 0.75 | 1.0 MgO | 2.0 Sb$_2$O$_3$ | >12 weeks. |
| 22 | 29.4 | 19.6 | 25.25 | 25.0 | 0 | 0.75 | 0.5 MgO | 3.0 Sb$_2$O$_3$ | Do. |
| 23 | 29.4 | 19.6 | 25.25 | 25.0 | 0 | 0.75 | 1.0 Ca(OH)$_2$ | 2.0 Sb$_2$O$_3$ | Do. |
| 24 | 29.4 | 19.6 | 25.25 | 25.0 | 0 | 0.75 | 0.5 MgO | 5.0 Sb$_2$O$_3$ | Do. |
| 25 | 29.4 | 19.6 | 25.25 | 25.0 | 0 | 0.75 | 0.5 MgO | 5.0 SbCl$_3$ | Do. |
| 26 | 24.0 | 16.0 | 15.5 | 25.0 | 19 | 0.5 | 0.5 MgO | 5.0 Sb$_2$O$_3$ | Do. |

The practical significance of the stability of the compositions of this invention as compared to conventional crosslinked gels and as illustrated above is easily appreciated. Crosslinked, gelled, water-bearing blasting explosive compositions have a high degree of utility in the field. Sometimes these are stripped from the containers and loaded directly into the borehole. Such a "shucking" operation is practicable only if the composition retains its original non-tacky characteristics. Even when freed from the container, the crosslinked compositions should retain a high degree of resistance to disintegration and leaching by water which may be present or may enter the borehole after the blasting composition is loaded therein. Disintegration and leaching, if they do occur, may lead to failures of the compositions to explode or failures of propagation of a column of explosive through a section which has been exposed to water. The crosslinking compositions made by the present process are remarkably free from failures of this kind. Finally, if the gel structure deteriorates, segregation of components, especially undissolved fuels and oxidizing agents, can take place under the force of gravity, and compositions whether still in the cartridge, or "shucked" therefrom, will become so heterogeneous that complete failures of detonation or failures to propagate detonation through the full length of the charge column will occur. The instant inventive process and the blasting agent compositions produced thereby minimize and essentially overcome the deficiencies of heretofore known crosslinked gelled blasting agent compositions.

I claim:

1. A process for gelling galactomannan gums which comprises mixing water, galactomannan gum, about from 0.05 to 20% by weight, calculated as metal and based on the weight of galactomannan, of at least one crosslinking agent selected from the group consisting of compounds of the metals antimony and bismuth soluble in the system, and base, said gelation being carried out at a pH of about from 6 to 13.

2. A process of claim 1 wherein said galactomannan is about from 0.25 to 5% by weight of locust bean gum.

3. A process of claim 1 wherein said galactomannan is about from 0.25 to 5% by weight of guar gum.

4. A process of claim 1 wherein said crosslinking agent is selected from at least one of the group consisting of antimony oxide, potassium antimony tartrate, antimony and about from 0.25 to 5% of guar gum, about from 0.05 to 20% by weight of antimony oxide based on said guar gum, and adjusting the pH of the resulting mixture to about from 7 to 11 with magnesium oxide.

8. In the process for gelling water-bearing explosive compositions containing galactomannan gums with crosslinking agents in situ, the improvement which comprises uniformly incorporating therein about from 0.5 to 20%, calculated as metal and based on the weight of galactomannan, of at least one crosslinking agent selected from the group consisting of compounds of the metals antimony and bismuth soluble in the system, and base, said gelation being carried out at a pH of about from 6 to 13.

9. A process of claim 8 wherein said explosive composition contains ammonium nitrate, said quantity of crosslinking agent is about from 0.3 to 10% and said pH is below about 8.

10. A stable aqueous gel comprising a uniform mixture of water and galactomannan gum gelled in situ at a pH of about from 6 to 13 with base and about from 0.05 to 20%, calculated as metal and based on the weight of galactomannan, of at least one crosslinking agent selected from the group consisting of compounds of antimony and bismuth soluble in the system.

11. A stable, gelled, water-bearing explosive composition comprising a uniform mixture of at least one water-soluble, inorganic oxidizing salt, at least one fuel, about from 5 to 45% by weight of water, and about from 0.25 to 5% by weight of galactomannan crosslinked in situ at a pH of about from 6 to 13 with about from 0.05 to 20%, calculated as metal and based on the weight of galactomannan, of crosslinking agent selected from the group consisting of compounds of antimony and bismuth soluble in the system.

12. A stable, gelled, water-bearing explosive composition comprising:
(a) about from 20 to 60% by weight of ammonium nitrate and up to about 40% by weight of sodium nitrate,
(b) about from 10 to 40% by weight of self-explosive comprising TNT,
(c) about from 10 to 25% by weight of water, and
(d) about from 0.3 to 2% by weight of galactamannan gum, crosslinked in situ in the presence of added base, at a pH of about from 6 to 8 with about from 0.3 to 10% by weight, calculated as metal and based on the weight of galactomannan, of crosslinking agent selected from the group consisting of compounds of antimony and bismuth soluble in the system.

13. An explosive of claim 12 wherein said galactomannan is guar gum and said crosslinking agent is antimony oxide.

14. An explosive of claim 13 wherein said base is magnesium oxide.

References Cited by the Examiner

UNITED STATES PATENTS

| | | | |
|---|---|---|---|
| 2,768,073 | 10/56 | Davidson | 149—45 |
| 3,018,252 | 1/62 | Carson et al. | 252—316 |
| 3,041,288 | 6/62 | Anthony | 252—316 |
| 3,072,509 | 1/63 | Barnhart | 149—2 |

CARL D. QUARFORTH, *Primary Examiner.*